Nov. 13, 1956  J. T. KRAPP  2,770,256
VALVED COUPLING
Filed July 19, 1951. 3 Sheets-Sheet 2
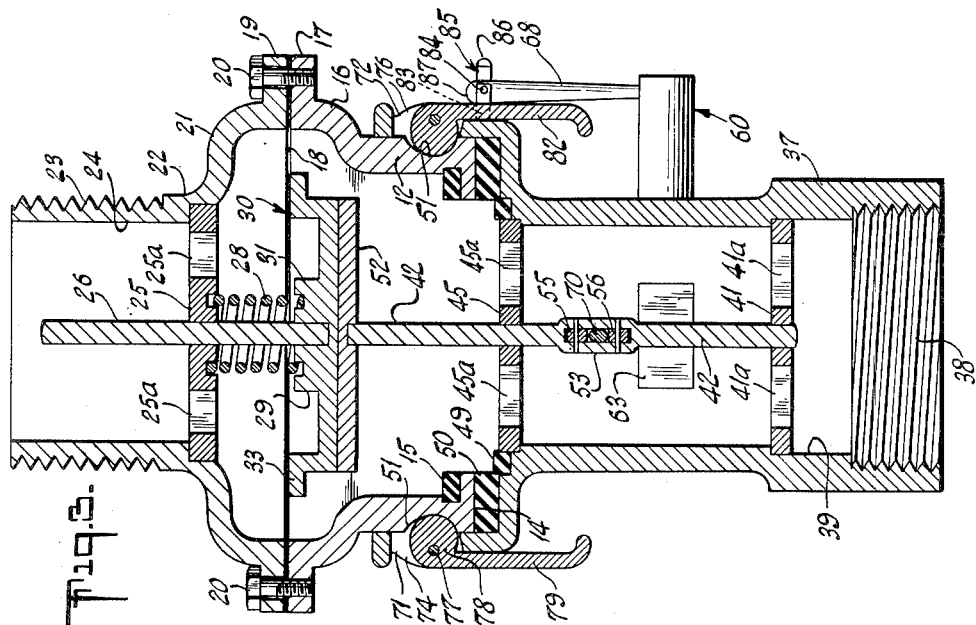
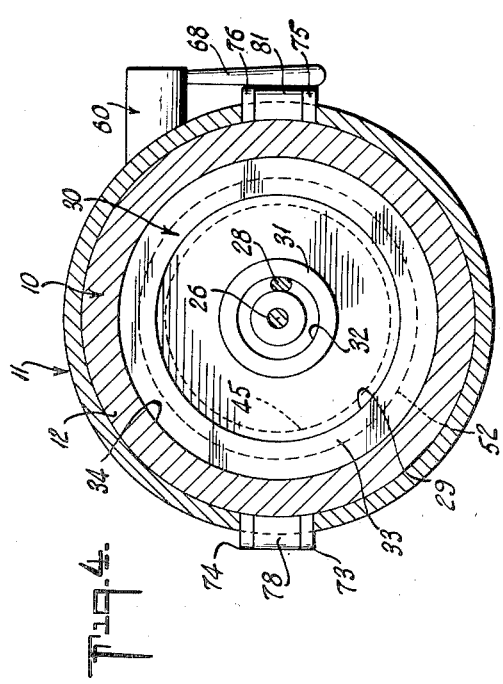
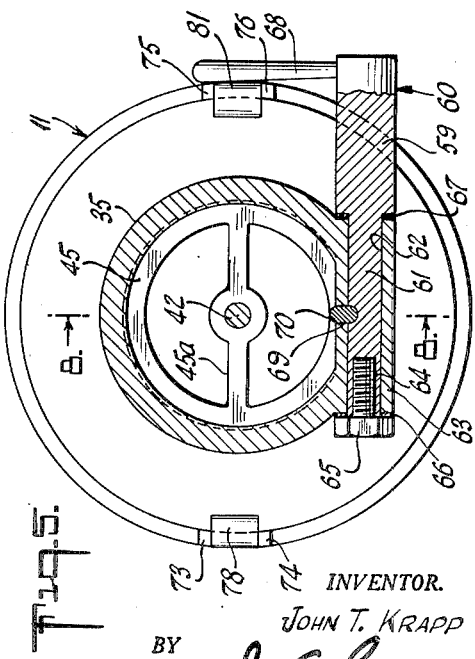
INVENTOR.
JOHN T. KRAPP
BY
ATTORNEY

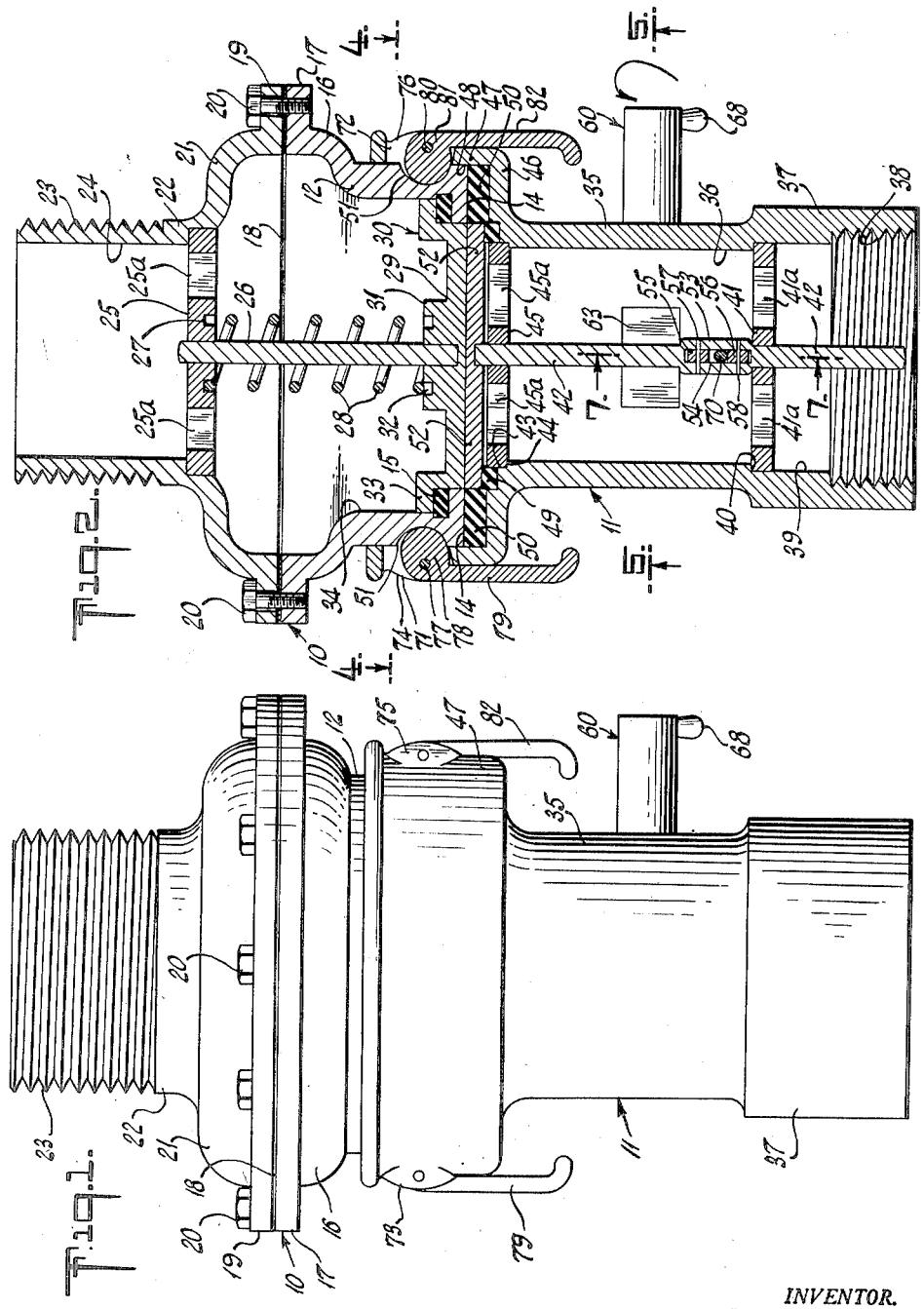

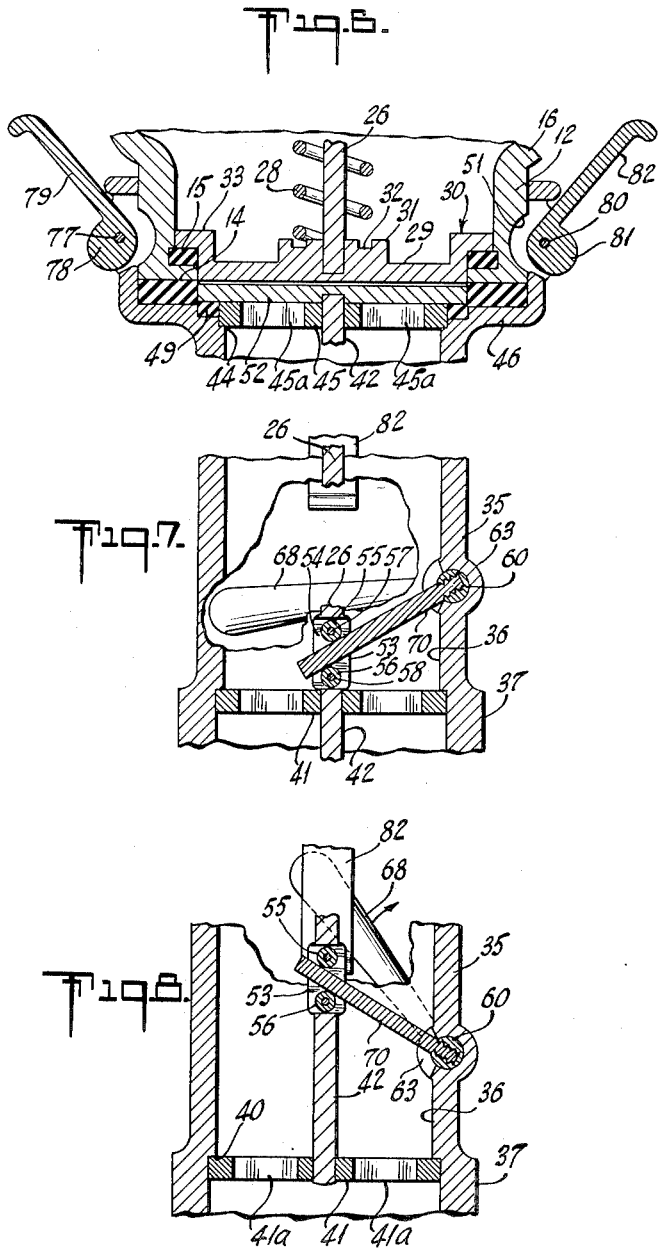

United States Patent Office 2,770,256
Patented Nov. 13, 1956

2,770,256

VALVED COUPLING

John T. Krapp, Port Washington, N. Y.

Application July 19, 1951, Serial No. 237,595

1 Claim. (Cl. 137—614)

This invention relates to improvements in separable coupling devices, wherein two members comprising the coupling have portions which telescope together, one member having a gasket on a shoulder therein which is engaged by a seating face formed on the end of the other member, valve means in the latter flush with said seating face, valve means in said first member flush with said gasket, and valve actuating means in said first member, operable from the exterior thereof.

Another object of the invention is the provision, in a separable coupling device, of a valve completely spanning the passage in one coupling member, a valve spanning the passage in the other member, said valves having faces coextensive and in contact with each other when said members are telescoped together, so that when the valves are closed prior to separating said members, any fluid medium in the coupling passages is confined thereto and the amount of fluid medium lost by separating the coupling members is substantially nil.

Other objects and advantages of the invention will be apparent to those skilled in the art, upon a study of this specification and the accompanying drawings.

Referring to the drawings:

Figure 1 is an elevational view of one embodiment of the invention;

Figure 2 is a sectional elevation, of the coupling of Figure 1, showing the coupling members engaged, but with the valves still closed;

Figure 3 is a view similar to Figure 2 except that the valves have been opened;

Figure 4 is a sectional plan view taken along the line 4—4 of Figure 2;

Figure 5 is a sectional plan view, taken along the line 5—5 of Figure 2;

Figure 6 is a sectional fragmentary view showing the relation of the valves, when the coupling members have been placed together and before the gasket has been compressed to effect a fluid tight seal therebetween;

Figure 7 is a fragmentary view taken along line 7—7 of Figure 2 and showing the positions of some of the valve actuating elements when the valves are closed; and Figure 8 is a view similar to Figure 7, taken along the line 8—8 of Figure 5, and showing the positions of some of the valve actuating elements when the valves are open.

Referring first to Figures 1, 2 and 3, the coupling is comprised of two quickly separable members, one of which is designated by the numeral 10 and the other of which is designated by the numeral 11. The member 10 might be termed the male member. It includes an annular portion 12, the lower end of which carries an internal flange 13, the lower face of which forms a seating face 14, and a portion of the upper face forms a support for a gasket 15, the purpose of which will presently be described.

An extension of the annular portion 12 is an outward flare 16 which terminates in an outward extending flange 17. Mating with the flange 17 with a gasket 18 therebetween is a flange 19 secured to the flange 17 by means of cap screws 20 extending through clearance holes in the flange 18 and into tapped holes in the flange 17.

The flange 19 is formed integral with an inwardly extending flared portion 21 which joins a tubular portion 22 having external threads 23 formed thereon and an internal passage 24 therethrough. Set into the wall of the portion 22, where it joins the portion 21 is a spider 25, which has a central bearing hole therein in which the upper end of a valve stem 26 is reciprocally carried. The spider has an annular groove 27 formed therein to accommodate the upper end of a spring 28.

A valve member 30 has an annular groove 29 formed therein, leaving a central boss 31 which is also provided with an annular groove 32 to accommodate the lower end of the spring 28. The valve member is positively connected to the stem 26 and moves therewith. The valve member 30 has an annular rim 33 which forms a working fit with the inner wall 34 of the portion 12 and the lower surface of the rim 33 seats on the gasket 15.

Near the lower face 14, the tubular portion 12 has an external annular groove 51 formed therein which constitutes one of the cooperative elements for forcing the two coupling members into fluid tight relation.

The female member 11 includes a tubular portion 35 which has an internal wall 36. The lower end 37 of the portion 35 has internal threads 38 formed therein to accommodate a pipe or fitting and beyond the threads 38 is formed a bore 39 terminating on a shoulder 40 into which is pressed a spider 41 having openings 41a therethrough. The spider has a central bearing hole therein in which a valve stem 42 reciprocates. The tubular portion 35 has at its upper end a bore 43 which terminates on a shoulder 44 and into this bore is pressed a spider 45 having passages 45a therethrough. The upper end of the tubular portion has a radial extension 46 formed integral therewith and the portion 46 joins an enlarged cylindrical portion 47 which has an interior bore 48 with which the tubular portion 12 of the male member forms a working fit.

Seated within the tubular portion 47 and upon the radial portion 46 is an annular gasket 50 upon which the seating face 14 of the male member is seated when the two members are secured together. Between the annular gasket 50 and the spider 45 is formed an annular groove which accommodates a gasket 49 upon which a valve, to be presently described, seats. The spider 45 has a central bearing hole therein in which the upper end of the valve stem 42 reciprocates. Secured on the upper end of the valve stem 42 above the spider 45 is a valve disc 52 which is substantially the same diameter as the interior diameter of the annular gasket 50, with sufficient clearance to enable the valve disc to be moved after the two members are clamped together. As a matter of fact, when the two members are clamped together the gasket 50 tends to bulge inwardly and if the outer diameter of the valve disc 52 were exactly the inner diameter of the gasket 50 when the latter is not compressed, it would be impossible to move the valve disc upwardly after the two elements are clamped together, so this clearance is necessary and yet the object is to provide as little clearance spaces as possible thereby minimizing the loss of any fluid medium being conveyed through the couplings upon the separation of the two members.

The valve stem 42 has an enlarged flattened portion 53 which has a slotted opening 54 formed therein. Within the opening 54 are spaced rollers 55 and 56 journaled respectively on shafts 57 and 58. A shaft 60 which may be seen in Figure 5 has a head portion 59 which is outside the tubular portion 35 of the female member 11, and a portion 61 of reduced diameter which is journaled in a bearing hole 62 formed in a boss 63 formed on said tubular portion 35. The shaft portion 61 of reduced diameter has a threaded hole 64 formed in the end thereof and this hole is engaged by a capscrew 65 with a washer 66 between the end of the boss 63 and the head of the capscrew. A similar washer 67 is positioned between the shoulder at the end of the shaft portion 59 and the right end of the boss 63 as seen in Figure 5. Secured in the end of the shaft 60 and extending radially therefrom is an arm or lever 68. Secured in the shaft portion 61 and extending through a slot 69 in the inner wall of the boss 63 is a lever 70 which extends through and between the rollers 55 and 56 in the valve stem 42.

The tubular portion 47 has slots 71 and 72 formed therein. These slots are oppositely disposed in the annulus 47 and the slot 71 is bounded by spaced bosses 73 and 74 while the slot 72 is bounded by spaced bosses 75 and 76. The bosses 73 and 74 have aligned holes therethrough which support a shaft 77. A cam 78 is journaled on the shaft 77 and has formed integral therewith a lever 79 for rotating the cam 78 about the shaft 77 for causing said cam to engage the annular groove 51 in the male member and force the seating face 14 in fluid tight relation with the gasket 50 when the lever is moved in a counterclockwise direction as viewed in Figure 2. The bosses 75, 76 have aligned holes therein which support a shaft 80, and a cam 81 is journaled on the shaft 80 and has formed integral therewith a lever 82. By means of this lever the cam 81 is moved into engagement with the annular groove 51 on the male member for forcing its side of the face 14 into fluid tight relation with the gasket 50. When it is desired to separate the couplings, the levers 79 and 82 are moved upwardly as shown in Figure 6 thereby disengaging the cams 78 and 81 from the annular groove 51 and leaving the male coupling free to be withdrawn. This is the position shown in Figure 6.

When the coupling members 10 and 11 are telescoped together and the levers 79 and 82 are thrown downwardly to force the seating face 14 into fluid tight relation with the gasket 50, the operator may then rotate the shaft 60 counterclockwise as seen from the right end of Figure 2, by means of the lever 68. As the shaft 60 is rotated, the lever 70 is moved upwardly and due to the presence of the rollers 55 and 56 the motion of the lever 70 is transmitted to the valve stem 42, as may be seen in Figures 8 and 2. The upward motion of the valve stem 42 causes the valve disc 52 to move upwardly, thereby leaving the gasket 49. Since the valve member 30 in the male member is in contact with the valve disc 52 which is also moved upwardly against the urge of the spring 28, the annular portion 33 thereof leaves the gasket 15. As the movement of the shaft 60 through the medium of the lever 68 is continued, the valve member 52 and the valve member 30 assume a position such as that shown in Figure 3 wherein fluid medium may pass through the openings 25a in the spider 25 and thence around the valve discs 30 and 52 and via the passages 45a in the spider 45 and then downwardly through the passages 41a in the spider 41 and then out via the lower end of the coupling.

When the couplings are connected between a source of a fluid medium and a receptacle or point of use, and the valves are opened as described above by rotating the shaft 60 through the medium of the lever 68, the fluid medium flows freely through the passages described and thence to the receptacle or point of use. Now when it is desired to separate the coupling members 10 and 11, the shaft 60 is rotated in a clockwise direction as seen from the right side of Figure 2, thereby swinging the lever 70 downwardly to the position shown in Figure 7, and thereby the valve stem 42 is also moved downwardly causing the valve members 52 and 30 to seat on the gaskets 49 and 15 respectively. Now due to the fact that there is substantially no clearance space between the upper surface of the valve member 52 and the lower surface of the valve member 30, the separating of the coupling members by throwing the levers 79 and 82 upwardly to the positions shown in Figure 6, wherein the coupling members may be separated, there is substantially no loss of the fluid medium when the coupling members are separated.

The lever 68 in the shaft 60, when moved clockwise to cause the valve members 52 and 30 to be positioned as shown in Figure 3, is adjacent to the lever 82 and latch means 85 carried on a pivot 84 thereon and having spaced jaws 83, which jaws are spaced far enough apart to straddle the lever 82, is provided for maintaining the valves in the upward position shown in Figure 3. Now when it is desired to close the valve members 30 and 52, the latch means 85 is swung in a counterclockwise direction as seen in Figure 3 until its axis is substantially parallel to the axis of the lever 68, at which time the head or yoke portion 86 of the latch engages the apex 87 of the lever. One important feature of this latch arrangement is that before the lever 82 can be swung upwardly to the position shown in Figure 6 for separating the coupling members, the yoke member 85 must be disengaged from the lever 82, thereby making sure that the valves are closed before the coupling members can be separated.

Although I have herein shown and described, by way of example, one embodiment of my new and improved coupling having valves therein operable from outside of the casing, it is obvious that many changes may be made in the arrangement herein shown and described without departing from the spirit of the invention.

I claim:

In a separable coupling, a female member having a passage therethrough, a passage of larger diameter communicating with said passage and forming a shoulder therebetween, a sealing gasket on said shoulder, a valve seat formed in said member adjacent to said gasket, a valve cooperating with said seat and having a stem extending axially in said first passage, cam means comprising cams rotatably carried in opposed clearance slots formed in the falls of said second passage, each of said cams having an actuating lever formed integral therewith, valve opening means comprising a shaft extending through the wall of said first passage and operatively connected to said stem, said shaft carrying an actuating lever adapted to rotate on a plane substantially tangent to the outer edge of at least one of said cam actuating levers when the latter is in an actuated position, a male member having a tubular portion adapted to fit into said second passage, said male member also having a seating face on the end thereof adapted to engage and form fluid tight seal with said gasket when said levers are actuated, a second valve seat formed in said male member adjacent to said seating face, a second valve means cooperating with said second seat and having a stem reciprocally movable on the axis of said second member, spring means embracing said stem and urging second valve onto its seat, and an annular groove formed on the exterior of said male member adjacent to said seating face and adapted to be engaged by said cam means when said tubular portion is positioned in said second passage with said end in contact with said gasket, both said valve means normally contacting each other when said members are secured together, thereby minimizing any loss of fluid when said members are separated and causing them to move in unison to open positions when said valve opening means is actuated.

References Cited in the file of this patent

UNITED STATES PATENTS

| | | |
|---|---|---|
| 1,106,633 | Denehie | Aug. 11, 1914 |
| 1,782,238 | Kirchhan | Nov. 18, 1930 |
| 1,927,448 | Terry | Sept. 19, 1933 |
| 2,033,142 | Lewis | Mar. 10, 1936 |
| 2,034,933 | Wilson | Mar. 24, 1936 |
| 2,112,146 | Di Giovanni | Mar. 22, 1938 |
| 2,368,120 | Downey | Jan. 30, 1945 |
| 2,441,075 | Krapp | May 4, 1948 |
| 2,518,026 | Krapp | Aug. 8, 1950 |
| 2,574,022 | Dahl | Nov. 6, 1951 |